A. BRECHEISEN.
ANIMAL TRAP.
APPLICATION FILED JUNE 10, 1908.
942,481.
Patented Dec. 7, 1909.
2 SHEETS—SHEET 1.
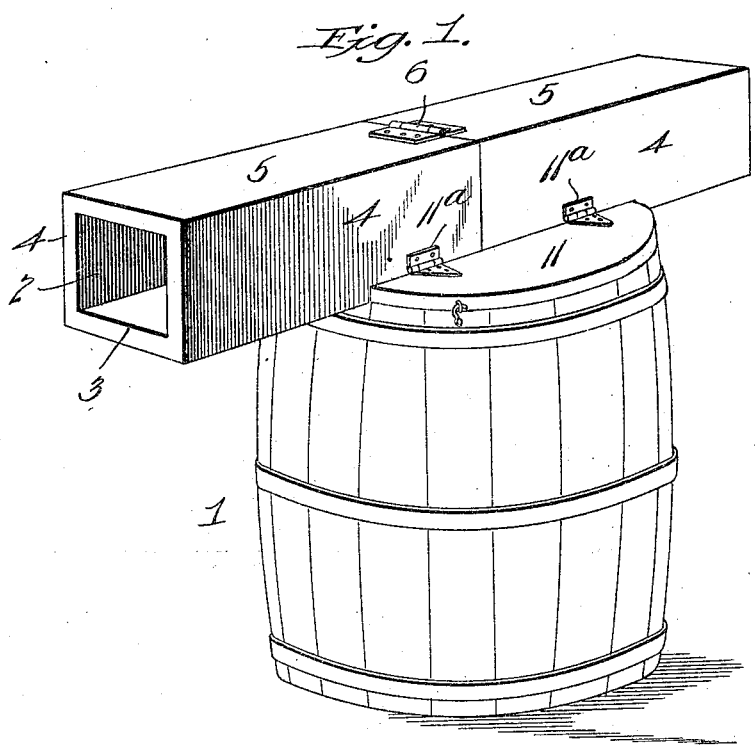
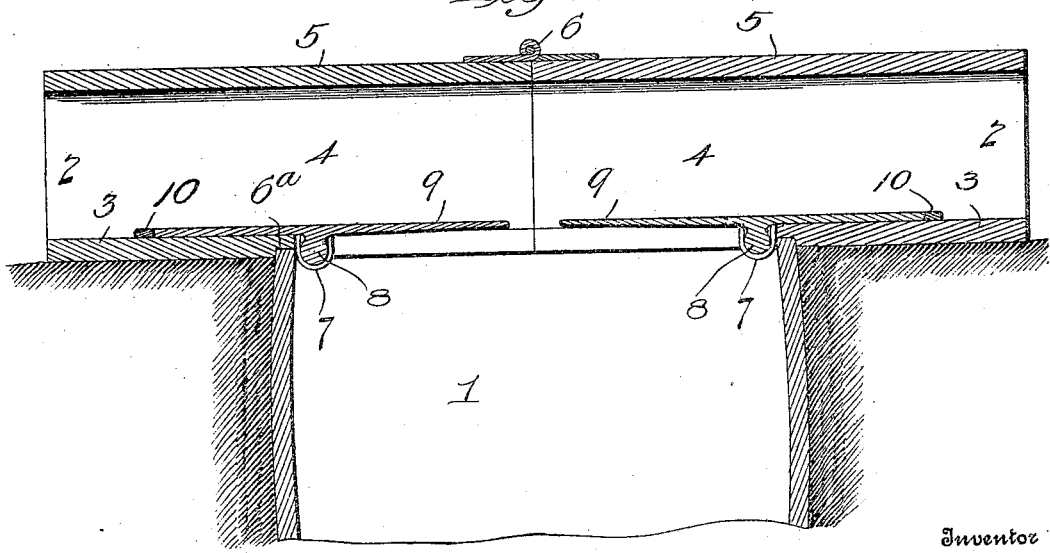
Witnesses
Inventor
Albert Brecheisen
By
Attorney

A. BRECHEISEN.
ANIMAL TRAP.
APPLICATION FILED JUNE 10, 1909.

942,481.

Patented Dec. 7, 1909.
2 SHEETS—SHEET 2.

Witnesses

Inventor
Albert Brecheisen
By
Attorney

UNITED STATES PATENT OFFICE.

ALBERT BRECHEISEN, OF KANSAS CITY, MISSOURI.

ANIMAL-TRAP.

942,481.　　　　　　　Specification of Letters Patent.　　Patented Dec. 7, 1909.

Application filed June 10, 1908. Serial No. 437,713.

*To all whom it may concern:*

Be it known that I, ALBERT BRECHEISEN, a citizen of the United States, residing at Kansas City, in the county of Jackson and State of Missouri, have invented certain new and useful Improvements in Animal-Traps, of which the following is a specification.

My invention relates to new and useful improvements in animal traps, of the type generally known as "everset", and particularly those which embody in their construction a receptacle or compartment for receiving and holding the animal, said compartment having associated therewith an entrapping device usually in the form of a drop, trap door, or gate through which the animal may pass into the receptacle or compartment, but which is of such construction as to effectually prevent exit therefrom.
The primary object of my invention is to provide a trap of the character mentioned which will be extremely simple in construction, and durable and efficient in attaining the purposes for which it is devised.
A further object is to provide a trap, the parts of which may be readily and conveniently disassembled for the purpose of packing for storage or transportation.

Figure 3:
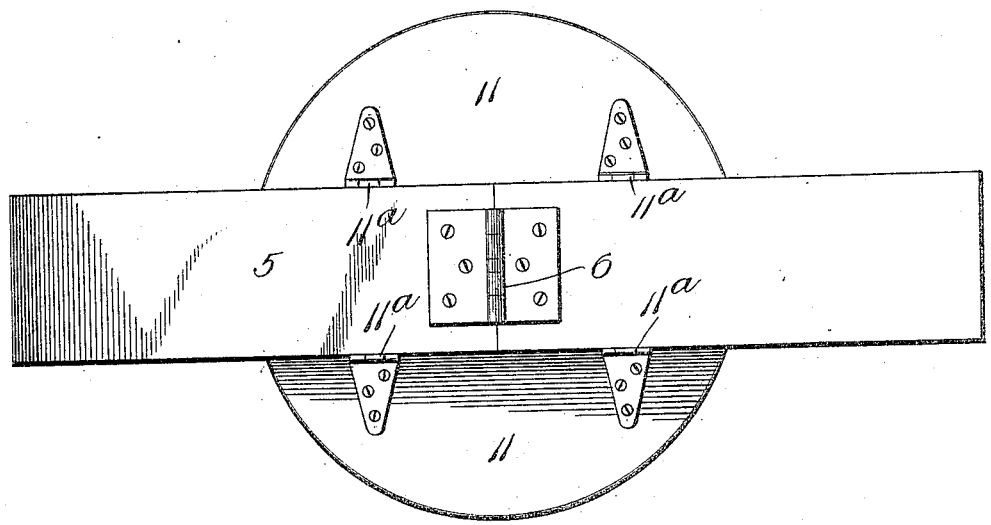
Figure 4:
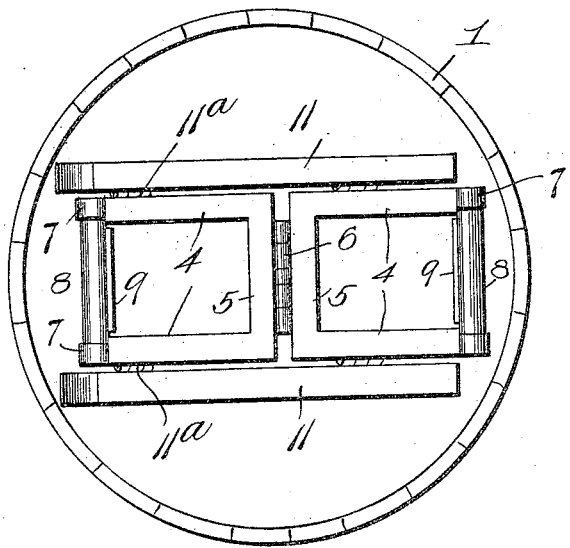

The invention consists in the novel construction of parts and their arrangement in operative combination to be fully described hereinafter and the novelty of which will be particularly pointed out and distinctly claimed.
I have fully and clearly illustrated my invention in the accompanying drawings to be taken as a part of this specification and wherein:

Figure 1 is a perspective view of a trap embodying my invention. Fig. 2 is a vertical central section through the same. Fig. 3 is a top plan view of the invention. Fig. 4 is a view of the receptacle or compartment showing the entrapping device folded and stored therein for the purposes of transportation or storage.

Referring to the drawings by numerals of reference: 1, designates a receptacle or compartment which may be of any desired or suitable construction and conformation to adapt it to the purposes for which it is intended. For the purposes of illustration only, I have shown this receptacle as being in the form of a keg, although I wish it understood that such form is not at all essential to the effective and proper operation of the invention.

Associated with the receptacle 1, is an entrapping device through which the animals pass and have ready access to the interior of the receptacle, but which is of such construction as to effectually prevent exit of the animals after once becoming occupants of said receptacle. This entrapping device is so constructed that it may readily be separated from said receptacle, folded and deposited within said receptacle for storage or transportation, said device being constructed as follows:

2, 2, designate passages or entrance ways, which may be of any suitable construction, but are shown as consisting of tubular members composed of bottom walls 3, 3, side walls 4, 4, and top walls 5, 5, the said members being arranged end to end in longitudinal alinement, the inner ends of said members being disposed closely adjacent to each other and connected by means of a hinge 6, the respective elements of said hinge being securely fastened to the respective top walls 5, 5, of said members. By this construction it will be seen that said members may be folded on each other so as to occupy but small space when stored as will be hereinafter more fully set forth.

The members 2, 2, above described, when extended or placed end to end are designed to rest upon the open upper end of the receptacle, the latter being buried in the ground, as indicated in Fig. 2, or not, as may be desired. The members 2, 2, when in operative position upon the receptacle, combine to form practically a single passageway extending across the top of the receptacle, and are of such length that the outer or entrance ends project some distance outward beyond the wall of the receptacle. The bottom wall of each of these passageways or members 2, 2, is cut-away at its inner end so that the bottoms of the members open downward into the receptacle, the said bottom walls being cut-away in such a manner that each member is provided with a shoulder $6^a$, which abuts the wall of the receptacle, said shoulders combining to provide means for preventing endwise movement of the tubular members across the upper portion of the receptacle. Each of the said tubular members, is provided on its under portion adjacent the shoulder 6ª, with oppositely disposed eyes 7, 7, which receive spindles 8, projecting from the opposite sides of a trap-door or drop 9, part of which projects over the cut-away portion of the bottom wall, said spindles forming a pivotal support for the said drop. It will be understood that each of the tubular members is provided with one of these drops, which are so arranged that an animal entering the passage-way and walking on the drop will swing the latter on its pivot and be thereby dropped into the receptacle 1. In the preferred form of the invention, the drops are pivoted at a point intermediate their ends, so that one end will rest within the tubular member upon the floor thereof, said end being normally held in such position by means of a weight 10, attached thereto, whereby each of the drops is maintained in a substantially horizontal position except when the weight of an animal upon the inner or unweighted end causes the drop to swing upon its pivots. It will be apparent that these drops when operated return automatically to their normal positions through the agency of the weights just referred to.

Upon reference to the drawings, it will be seen that the members 2, 2, are of a width considerably less than the diameter of the receptacle 1, and I therefore provide simple and effective means for closing the spaces between the side walls of the said member and the wall of the receptacle, said means also serving to hold the members 2, 2, in rigid longitudinal alinement. For the purpose stated, I provide on each of the opposite vertical walls of the said members, a member 11, which I preferably hinge to the said tubular members so that it may be folded upward against the adjacent side wall of the latter, said member being hinged to both of said tubular members as shown at 11ª. In the present embodiment of the invention the members 11, are in the form of segments of a circle, and are of such size as to effectually close the upper portions of the receptacle on opposite sides of the tubular members 11, when the latter are in horizontal position, said members being suitably secured to the receptacle by any fastening device which will answer the purpose satisfactorily. In the present instance, I have shown this fastening means as consisting of coöperating hooks and eyes carried respectively by the said members 11 and the receptacle. With said members 11, operatively connected to the receptacle it will be seen that the tubular members 2, 2, are held in proper operative relation to each other and to the receptacle.

When it is desired to disassemble the parts and pack the same, the members 11, 11, are detached from the receptacle, and one of the hinges 11ª, disconnected from one of the tubular members, corresponding hinges being disconnected as will be understood. The members 2, 2, are then free to be swung or folded upon each other, and the whole entrapping device then deposited in the receptacle for the purposes of storage, or packing for transportation.

Having thus described my invention what I claim and desire to secure by Letters Patent is:

1. In a trap of the character described, a receptacle, an entrapping device associated therewith comprising a tubular member opening into the receptacle, and having a drop, said member consisting of a plurality of parts foldable with relation to each other, and means for detachably connecting said device in operative relation to the receptacle, and means for holding the parts of said tubular member in operative relation to each other.

2. In a trap of the character described, a receptacle, an entrapping device associated therewith comprising a tubular member adapted to be supported in position to communicate with the said receptacle, means for controlling communication between said member and the receptacle, said member comprising a plurality of parts normally in longitudinal alinement with each other, but foldable with relation to each other, and means for detachably connecting said device to the receptacle.

3. In a trap of the character described, a receptacle, an entrapping device associated therewith comprising a tubular member adapted to be supported in position to communicate with the said receptacle, means for controlling communication between said member and the receptacle, said member comprising a plurality of parts normally in longitudinal alinement with each other, but foldable with relation to each other, and means for maintaining the said parts in longitudinal alinement with each other.

4. In a trap of the character described, a receptacle, an entrapping device associated therewith comprising a tubular member adapted to be supported in position to communicate with the said receptacle, means for controlling communication between said member and the receptacle, said member comprising a plurality of parts normally in longitudinal alinement with each other, but foldable with relation to each other, means for maintaining the said parts in longitudinal alinement with each other, and means for detachably connecting said device to the receptacle.

5. In a trap of the character described, a receptacle, an entrapping device associated therewith comprising a tubular member adapted to be supported above an open end of the receptacle and inclosing a portion thereof, and means hingedly connected to the said member for closing the remainder of the open end of the receptacle.

In testimony whereof I have signed my name to this specification in the presence of two subscribing witnesses.

ALBERT BRECHEISEN.

Witnesses:
  GEO. W. MICKLE,
  MABEL E. McAMIS.